(12) United States Patent
Gupta et al.

(10) Patent No.: US 11,157,282 B2
(45) Date of Patent: Oct. 26, 2021

(54) SCALING PERFORMANCE ACROSS A LARGE NUMBER OF CUSTOMER NODES

(71) Applicant: Shoreline Software, Inc., Redwood City, CA (US)

(72) Inventors: Anurag Gupta, Atherton, CA (US); Charles Ian Ormsby Cary, Redwood City, CA (US)

(73) Assignee: Shoreline Software, Inc., Redwood City, CA (US)

( * ) Notice: Subject to any disclaimer, the term of this patent is extended or adjusted under 35 U.S.C. 154(b) by 0 days.

(21) Appl. No.: 16/792,979

(22) Filed: Feb. 18, 2020

(65) Prior Publication Data

US 2021/0255868 A1    Aug. 19, 2021

(51) Int. Cl.
| | |
|---|---|
| *G06F 9/355* | (2018.01) |
| *G06F 9/48* | (2006.01) |
| *G06F 16/901* | (2019.01) |
| *G06F 9/54* | (2006.01) |
| *G06F 16/9038* | (2019.01) |
| *G06F 9/38* | (2018.01) |

(52) U.S. Cl.
CPC .......... *G06F 9/3555* (2013.01); *G06F 9/3891* (2013.01); *G06F 9/4843* (2013.01); *G06F 9/541* (2013.01); *G06F 16/9027* (2019.01); *G06F 16/9038* (2019.01)

(58) Field of Classification Search
CPC .... G06F 9/3555; G06F 9/3891; G06F 9/4843; G06F 9/541; G06F 16/9038; G06F 16/9027
See application file for complete search history.

(56) References Cited

U.S. PATENT DOCUMENTS

| | | | |
|---|---|---|---|
| 7,093,088 B1* | 8/2006 | Todd | G06F 11/1415 707/999.202 |
| 7,469,284 B1* | 12/2008 | Dubrovsky | H04L 41/042 709/201 |
| 8,930,954 B2 | 1/2015 | Hildrum | |
| 9,864,725 B1 | 1/2018 | DeSantis et al. | |
| 9,875,235 B1 | 1/2018 | Das et al. | |
| 10,108,458 B2 | 10/2018 | Chen | |
| 10,628,228 B1 | 4/2020 | Theunissen et al. | |

(Continued)

OTHER PUBLICATIONS

Gupta, Anurag et al., "Executing a Pipeline Command Sequence Designed For Execution on a Single Node across a Fleet of Nodes," U.S. Appl. No. 16/696,626, filed Nov. 26, 2019, Specification, Claims, Abstract, and Drawings, 36 pages.

(Continued)

*Primary Examiner* — Jonathan A Bui
(74) *Attorney, Agent, or Firm* — Carr & Ferrell LLP (57) ABSTRACT

Described are systems and methods for scaling performance across a large number of customer nodes by delegating management of execution of one or more tasks to the customer nodes. An example method may commence with ascertaining a set of the customer nodes eligible for delegation of the one or more tasks. The method may continue with deploying one or more control agents to the eligible set of the customer nodes. The one or more control agents may be configured to coordinate and execute the one or more tasks on the eligible set of customer nodes and selectively take one or more actions based on results of the execution of the one or more tasks.

14 Claims, 6 Drawing Sheets

(56) References Cited

U.S. PATENT DOCUMENTS

| | | | |
|---|---|---|---|
| 10,713,280 B2* | 7/2020 | Horowitz | G06F 11/3452 |
| 11,036,560 B1 | 6/2021 | Mcpherson et al. | |
| 2005/0038890 A1* | 2/2005 | Masuda | H04L 67/1023 |
| | | | 709/224 |
| 2006/0090165 A1* | 4/2006 | Martin | G06F 9/542 |
| | | | 719/318 |
| 2010/0058349 A1 | 3/2010 | Diwakar et al. | |
| 2014/0215077 A1 | 7/2014 | Soudan et al. | |
| 2015/0095917 A1* | 4/2015 | Challenger | G06F 9/4843 |
| | | | 718/104 |
| 2015/0160966 A1* | 6/2015 | Archer | H04L 67/10 |
| | | | 718/102 |
| 2016/0103698 A1 | 4/2016 | Yang et al. | |
| 2017/0255496 A1 | 9/2017 | Deng et al. | |
| 2017/0279703 A1* | 9/2017 | Wasmundt | H04L 43/08 |
| 2017/0310542 A1 | 10/2017 | Nair et al. | |
| 2017/0329648 A1* | 11/2017 | Ren | H04L 67/1002 |
| 2017/0371968 A1* | 12/2017 | Horowitz | H04L 67/1097 |
| 2019/0155660 A1 | 5/2019 | McQuighan et al. | |
| 2019/0196672 A1* | 6/2019 | Mikheev | G06F 16/26 |
| 2020/0050487 A1* | 2/2020 | Garla | G06F 9/3836 |
| 2020/0117434 A1* | 4/2020 | Biskup | G06F 8/71 |
| 2020/0174840 A1 | 6/2020 | Zhao et al. | |
| 2021/0149678 A1 | 5/2021 | Gupta et al. | |
| 2021/0157630 A1 | 5/2021 | Gupta et al. | |
| 2021/0194773 A1 | 6/2021 | Gupta et al. | |

OTHER PUBLICATIONS

Gupta, Anurag et al., "Executing a Pipeline Command Sequence Designed For Execution on a Single Node across a Fleet of Nodes," U.S. Appl. No. 16/684,001, filed Nov. 14, 2019, Specification, Claims, Abstract, and Drawings, 36 pages.

* cited by examiner

SCALING PERFORMANCE ACROSS A LARGE NUMBER OF CUSTOMER NODES

TECHNICAL FIELD

The present technology relates generally to distributed execution of computing tasks, and more particularly, but not by limitation, to scaling performance across a large number of customer nodes.

BACKGROUND

Most modern systems typically involve a centralized data center and a fleet of customer computers running on customer premises. Conventionally, an agent runs on a customer computer and pushes data back to the data center. For example, an agent running on a customer computer can assess the central processing unit (CPU) utilization and memory utilization of the currently running processes and put these data into a log. The log can be periodically sent to the centralized data center. In order for a customer to ascertain the data, the customer would need to use a portal that connects to the centralized database of the data center. This approach ensures that all data is being stored in one place. However, this approach has various downsides. The first downside involves limitations on the scalability of the backend because it could be difficult to scale up to a large number of computers. Another downside involves lag issues associated with periodically pushing the data to the backend. Yet another downside involves costs associated with replicating all the data generated by the customer machines in the centralized data center, which requires vast computing storage capacity to store and then execute queries on behalf of customers. Finally, having the backend process all data is prone to the single point of failure issue.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to one embodiment of the disclosure, a method for scaling performance across a large number of customer nodes by delegating management of execution of one or more tasks to the customer nodes is provided. The method may commence with ascertaining a set of the customer nodes eligible for delegation of the one or more tasks. The method may continue with deploying one or more control agents to the eligible set of the customer nodes. The one or more control agents may be configured to coordinate and execute the one or more tasks on the eligible set of customer nodes and selectively take one or more actions based on results of the execution of the one or more tasks.

According to one example embodiment of the disclosure, a system for scaling performance across a large number of customer nodes by delegating management of execution of one or more tasks to the customer nodes is provided. The system may include a backend module having one or more processors and a memory communicatively coupled to the one or more processors. The memory may store instructions executable by the one or more processors. The backend module may be configured to ascertain a set of the customer nodes eligible for delegation of the one or more tasks. The backend module may be further configured to deploy one or more control agents to the eligible set of the customer nodes. The one or more control agents may be configured to coordinate and execute the one or more tasks on the eligible set of customer nodes and selectively take one or more actions based on results of the execution of the one or more tasks.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The present disclosure is directed to various embodiments of systems and methods for scaling performance across a large number of customer nodes by delegating management of execution of one or more tasks to the customer nodes. A system for scaling performance across a large number of customer nodes, also referred to herein as the system, may include a backend module and a plurality of control agents. The backend module may be associated with a centralized data center. The plurality of control agents may be deployed to customer nodes. The backend module is also referred to herein as a backend. The backend may ascertain a set of the customer nodes eligible for delegation of tasks and deploy or more control agents to each of the eligible sets of the customer nodes. On each of the eligible sets of customer nodes, a control agent may coordinate and execute the tasks and selectively take actions based on results of the execution of the tasks.

The system of the present disclosure provides pushing down tasks from network resources of a centralized data center of a service provider to network resources of a customer. The terms "network resources of a customer," "customer nodes," "nodes," "hosts," and "customer computers" are used interchangeably herein and mean network machines associated with the customer. The term "pushing down" means delegating tasks by one network node/resource to another one or more network nodes/resources. Essentially, rather than executing a task inside a data center of the service provider, the task is executed on customer computers of a customer data center, such as an enterprise network.

From the scalability perspective, the advantage provided by the system of the present disclosure is performing the execution by multiple computers of the customer rather than by a smaller number of computers in the data center of the service provider. Another advantage is a lesser lag in processing of tasks because the controlling of a computer which runs its own processes is an order of magnitude faster than running processes across multiple computers of the data center of the service provider. Additionally, the execution of tasks on customer resources is less expensive because the customer has already paid for all resources and these processes utilize the unused capacity of the customer resources. Finally, the system of the present disclosure is fault tolerant because, rather than trying to control processes with a single point of failure, control actions are sent down to a plurality of customer nodes. This can be done in parallel across thousands of different customer computers.

Figure 1:
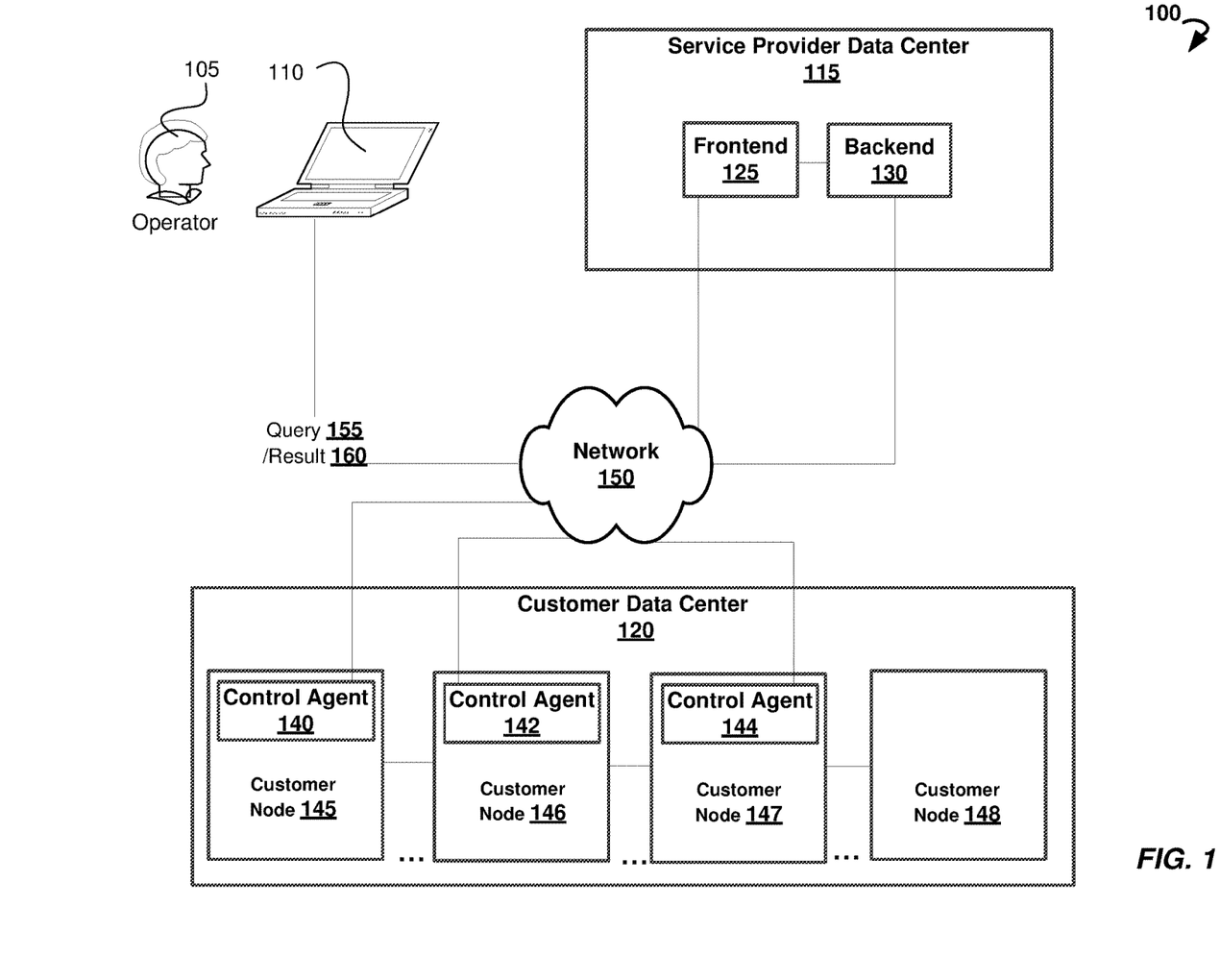
FIG. 1 is a high-level schematic diagram of an example computing architecture of a computing environment for implementing systems and methods for scaling performance across a large number of customer nodes by delegating management of execution of one or more tasks to the customer nodes.

Referring now to the drawings, FIG. 1 is a high-level schematic diagram of an example computing architecture (hereinafter referred to as architecture 100) of a computing environment for scaling performance across a large number of customer nodes by delegating management of execution of one or more tasks to the customer nodes. The architecture 100 can include an operator 105, a computing device 110 associated with the operator 105, a service provider data center 115, a customer data center 120, and a network 150. The service provider data center 115 may include a frontend 125 (including frontend nodes) and a backend 130 (including backend nodes). In an example embodiment, the service provider data center 115 may act as a system for scaling performance across a large number of customer nodes. In some embodiments, the system may include a server or cloud-based computing device configured to specifically perform the operations described herein. The system can also include a plurality of distributed computing systems that cooperatively provide the features of the system. For example, individual systems of the plurality of distributed computing systems can provide one or more unique functions or services. In some embodiments, the system can comprise a cloud computing environment or other similar networked computing system.

The customer data center 120 may have a plurality of network resources shows as customer nodes 145, 146, 147, and 148. The backend 130 may be in communication with the customer data center 120. The backend 130 may be configured to ascertain which of the customer nodes 145, 146, 147, and 148 are eligible for delegation of tasks. For example, the backend 130 may ascertain that customer nodes 145, 146, and 147 are eligible for delegation of tasks, but the customer node 148 is ineligible for delegation of tasks. The backend 130 may deploy control agents 140, 142, and 144 to the customer nodes 145, 146, and 147 ascertained as eligible, respectively. As used herein, a control agent, or an agent, is a software that runs on a network resource associated with the customer (such as a customer computer or a node), collectively referred to as control agents. The control agents 140, 142, and 144 can directly communicate with the system for scaling performance across a large number of customer nodes (for example, with the backend 130).

Each of the computing device 110, the service provider data center 115, and the customer data center 120 may communicate with each other via the network 150. The network 150 may include the Internet, a computing cloud, Representational State Transfer services cloud, and any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Limited duplex paging network, Bluetooth radio, or an IEEE 802.11-based radio frequency network. The network 150 can further include or interface with any one or more of Recommended Standard 232 (RS-232) serial connection, an IEEE-1394 (FireWire) connection, a Fiber Channel connection, an IrDA (infrared) port, a Small Computer Systems Interface connection, a Universal Serial Bus connection or other wired or wireless, digital or analog interface or connection, mesh or Digi® networking. The network 150 may include a network of data processing nodes that are interconnected for the purpose of data communication.

When the operator 105 sends a query 155 to the service provider data center 115, the query 155 may be received by the frontend 125. The frontend 125 can provide the query 155 to the backend 130. The backend 130 may push down the query 155 to a subset of eligible customer nodes so that the query 155 is provided to and processed by a plurality of control agents 140, 142, and 144 associated with the of eligible customer nodes. The result 160 of the execution of the query 155 can be provided to the computing device 110.

Figure 2:
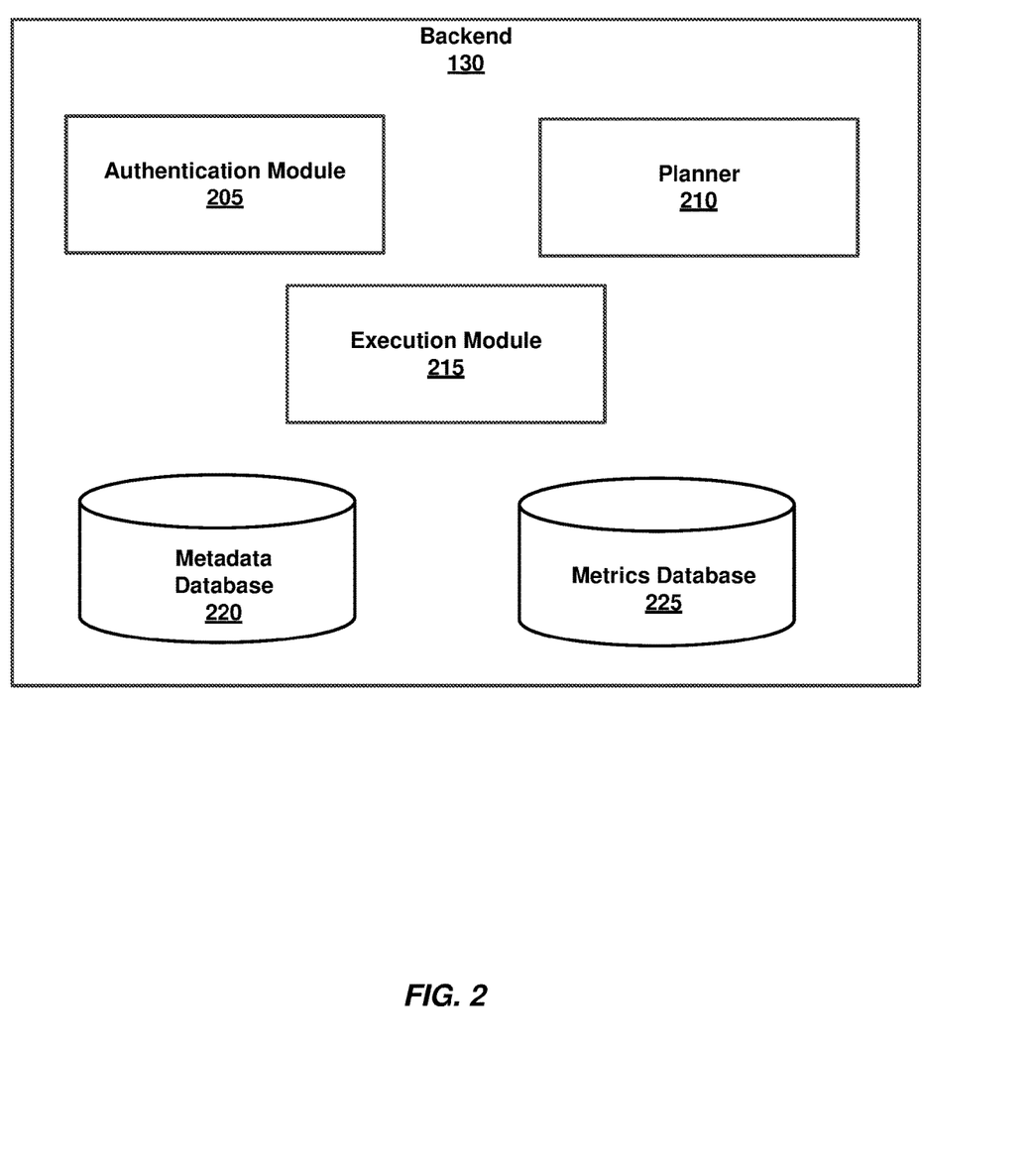
FIG. 2 is a block diagram illustrating a backend module of a system for scaling performance across a large number of customer nodes by delegating management of execution of one or more tasks to the customer nodes, according to some embodiments.

FIG. 2 is a block diagram illustrating a backend module of the system for scaling performance across a large number of customer nodes by delegating management of execution of one or more tasks to the customer nodes. The backend module is shown as a backend 130. The backend 130 may include an authentication module 205, a planner 210, an execution module 215, a metadata database 220, and a metrics database 225. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionality.

The frontend module shown as a frontend 125 in FIG. 1 can be configured to receive requests from a customer. For example, a request of the customer can include "list host|CP-U|average" to compute an average processing performance of hosts. In an example embodiment, the frontend may include a network load balancer that receives the request. The frontend can authenticate the customer that sends the request and perform a backend node mapping by checking a local cache to find customer information. If a corresponding entry with the customer information is present in the local cache, the frontend uses the corresponding backend node for routing the request. If an entry is not present, the frontend makes a request to the metadata database to fetch the backend node for the customer.

The frontend can update its local cache with the customer information received from the metadata database. When the mapping is completed, the frontend can forward a message to the selected backend node of the backend 130. The message can include a frontend identifier and a request, such that the frontend can receive results of the execution from the backend node later. For example, the request can come in from a command line interface or a website dashboard and may be then translated by the frontend into a common form, such as a command, to be sent to the backend 130.

The backend 130 can receive the command and return a checkpoint number to identify the receipt of the command to the frontend if the backend 130 determines that the customer is hosted by the backend node to which the command was sent by the frontend.

The backend 130 may use the authentication module 205 to authenticate the customer. In an example embodiment, the authentication of the customer may include identifying the customer based on customer information stored in the metadata database 220. The metrics database 225 may store metrics associated with the system under control of the customer (i.e., metrics associated with customer nodes). If the backend node does not host the customer, an error message can be returned to the frontend. In this case, the frontend may send a request to the metadata database to adjust the mapping of the customer to the backend node accordingly. As used herein, the system under control is a system of a customer that needs to be monitored and controlled. An example system under control may include an enterprise system, a system of a plurality of computing devices, a cloud system, a web-based system, a cloud-based system, and so forth. Each of the customer nodes may be a network device.

Upon receipt of the command, the backend 130 may ascertain a set of the customer nodes eligible for delegation of one or more tasks. The backend 130 may use the planner 210 to ascertain eligible customer nodes. The ascertaining may be performed based on predetermined criteria. In an example embodiment, the determining that the customer nodes are eligible may include ensuring that the customer nodes are available consistently. The tasks delegated to the eligible customer nodes may include execution of the command. In an example embodiment, the one or more tasks may include determining CPU utilization or determining memory utilization associated with the customer nodes. Other example tasks can include one or more of the following: providing a resource parameter, providing a new version of software, distributing a code artifact, distributing a runtime version, distributing a library, and so forth.

Upon ascertaining the eligible set of the customer nodes, the backend 130 may deploy one or more control agents to each of the eligible sets of the customer nodes. The one or more control agents may communicate with and leverage application programming interfaces (APIs) installed on the eligible customer nodes.

Upon being deployed on the eligible set of the customer nodes, the one or more control agents may be configured to coordinate and execute the one or more tasks on the eligible set of customer nodes. Specifically, the backend 130 can be configured to manage a plurality of control agents associated with the customer nodes. The backend 130 can manage execution of the plurality of tasks via the execution module 215 through control agents installed on the eligible set of the customer nodes. The control agents running on the customer nodes may be in communication with each other. The results of execution of the plurality of the tasks by the eligible set of the customer nodes may be reassembled into a response. The backend 130 can be further configured to provide the response to the customer by sending the response to the frontend.

In an example embodiment, the one or more tasks may be executed in parallel on the eligible set of the customer nodes. The one or more control agents may be further configured to selectively take one or more actions based on results of the execution of the one or more tasks.

The one or more control agents may be configured to implement one or more of the following procedures: coordination, planning, fanning out, state determination, and remediation. In other words, these procedures are delegated by the backend 130 to the one or more control agents deployed on the customer nodes. The procedures may be combined into two groups, where the first group includes coordination, planning, and fanning out, and the second group includes state determination and remediation.

Coordination. In general, the purpose of pushing down the processes is to leverage customer resources. However, in conventional push down processes, a backend is used whenever the coordination of synchronization is required across multiple computers. Thus, in the conventional systems, the synchronization of resources is still occurring on the backend. Even though the synchronization may only involve sending some values to the backend, there is still a lot of computations occurring on the backend because the backend coordinates synchronization of data across all customer computers.

For example, if a user wants to find out an average CPU utilization across multiple customer nodes, the backend needs to receive CPU utilization values from each customer node. Thus, if the backend fails, the entire process of determining the average CPU utilization stops operating. Furthermore, as the number of customer nodes increases to millions, various metrics sent to the backend increase accordingly, thereby resulting in possible scalability issues. Thus, even though most of the computations are pushed down to customer nodes, the process is still prone to a single point of failure and scalability issues.

In the CPU average calculation example, the query can be executed quickly because this query is simplistic. However, there can be much longer running queries, which may bog down resources of the backend for prolonged periods of time. If all coordination is occurring on the planner of the backend, the planner can be tied down for long periods of time just waiting for responses to the queries. For other tasks, for example, for creating new resources, this step can take even more time.

In the present disclosure, the solution of the difficulties faced by conventional systems includes planning a query on the backend, selecting a customer node as a coordinator, and pushing the query down to the customer node. Therefore, the customer node owns the execution of this query, i.e., coordinates the execution of the queries by sending queries to other nodes (e.g., sends out a CPU utilization request), aggregating the results, performing computations (e.g., compute average CPU utilization), and then sending the final result to the backend. This solution can enable the backend to nominate multiple customer nodes to perform various coordination and alleviate the scalability problems on the backend. Thus, if there is a fleet of customer nodes, instead of having one coordinator, the coordination can be delegated to a plurality of coordinators. Thus, pushing down the coordination is a valuable tool for solving the scalability problems of the backend. Coordination is one aspect of pushing down the processes and helps with scalability because the coordination eliminates a single point of failure issue and eliminates a single point of contention (e.g., when multiple resources try to access the same node).

Furthermore, the planner can select one coordinator for selecting/delegating coordination further to other customer nodes, such that the coordination can be distributed across multiple customer nodes. For example, the first customer node can be selected randomly. Each statement of a query may have a different coordinator.

In an example embodiment, a subset of customer nodes to be eligible as coordinators may be selected. The coordinators may include a subset of customer nodes that have a connection to the backend. The coordinators may act as dispatchers. The dispatchers are the only nodes that are allowed to communicate with the backend for reasons such as security because the customer may not want to have all of their resources/nodes/computers directly communicate with resources/nodes/computers outside of a data center/computing environment of the customer. Therefore, only the coordinators acting as dispatchers may communicate with the backend.

A coordinator can also act as a dispatcher even though the coordinator may perform a different function. In general, the dispatchers are used for traversing the network and implementing rules associated with a customer. Coordinators are used for organizing the actual execution of a query.

In an example embodiment, the coordination may include nominating a subset of the customer nodes to perform various tasks. The subset of the customer nodes may be configured to aggregate results of a query, perform computations on the results of the query, and provide final results of the computations. In particular, the subset of the customer nodes may provide the final results to the backend.

Figure 3:
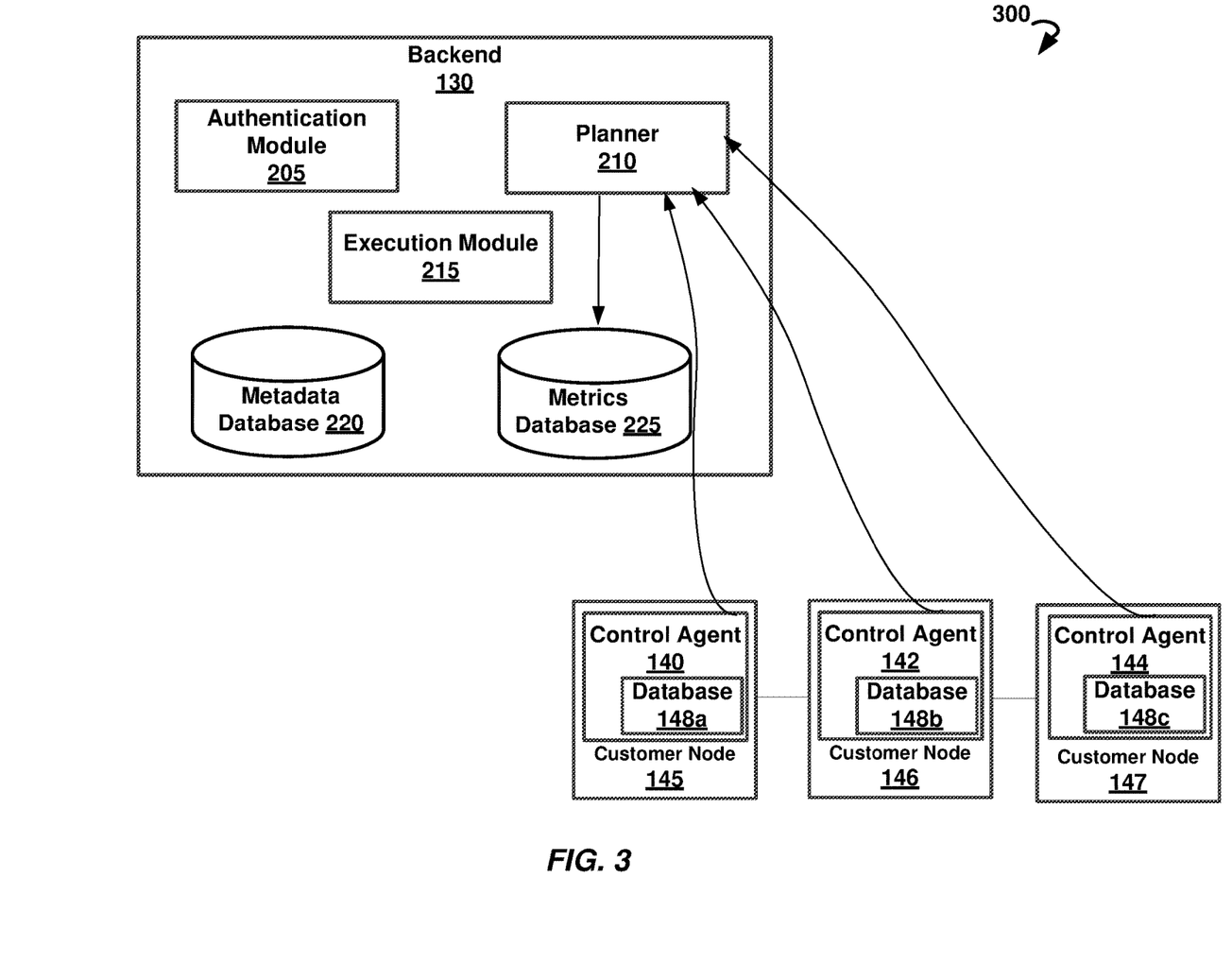
FIG. 3 is a block diagram showing pushing down a coordination procedure to customer nodes by a backend, according to an example embodiment.

FIG. 3 is a block diagram 300 showing pushing down a coordination procedure to customer nodes by a backend, according to an example embodiment. Control agents 140, 142, and 144 can collect various metrics of customer nodes 145, 146, and 147 on which the control agents 140, 142, and 144 are deployed, respectively. Each of the control agents 140, 142, and 144 may have a database 148*a*, 148*b*, and 148*c*, respectively, for storing collected data. Furthermore, the control agents 140, 142, and 144 may report the collected metrics to the planner 210 of the backend 130. The planner 210 may store the metrics to the metrics database 225.

In an example embodiment, the control agents 140, 142, and 144 may report the collected metrics only when an alert is generated or when the metrics are specifically requested. Furthermore, the control agents 140, 142, and 144 may take actions if it is determined, based on the metrics, that triggering conditions are present. The actions may include one or more of the following: issuing an alarm, creating a support ticket, taking a remediation action, and so forth.

Planning.

Pushing down the planning procedures solves the same issue of a single point of failure and pushes planning down from the planner of the backend to one or more customer nodes. The planner may be still deployed on the backend, but the planning can be pushed down to the customer nodes where the data resides. For example, the backend does not know what nodes exist in a node cluster, but knows which nodes are eligible for coordination and planning. The backend can send an assignment to one or more nodes eligible for coordination and planning. For the CPU average calculation example, the backend can send a message to each customer node in the node cluster instructing each customer node to determine CPU data of the customer node, compute an average CPU, and send the average CPU to the backend. Therefore, the planning is deferred and delegated to the customer nodes so that customer nodes themselves plan the execution of tasks and instruct other customer nodes to execute the tasks.

Fanning Out.

Fanning out is an important aspect in terms of scalability. If there is a number of customer nodes (e.g., a million of computers) and only one planner, sending out a request to every node may be very expensive because it may involve making a number of network calls (e.g., a million network calls). At any given time, a large subset of the nodes may not be performing because the nodes of the subset are slow or down. Thus, many Transmission Control Protocol (TCP) connections can come in slowly, time out, and never come back. Furthermore, there may be a considerable time difference between when the first node receives a message and when the last node receives the message. Thus, in case of a million of customer nodes, there may be numerous inefficiencies.

After the customer nodes are selected as eligible and control agents are deployed on them, the control agents may dispatch the tasks and then collect the results and give the results back to the planner. If, for example, there are 1,000,000 nodes and there are 10 dispatchers, each of the dispatcher may be responsible for 1/10 of the nodes. Thus, the dispatcher is still responsible for 100,000 nodes, which is still a large number. Therefore, a few layers of dispatchers can be added to form a tree with the planner at the top. If there are six dispatchers at the top layer, only a few layers are needed. In the lowest layer, each node may be responsible for just a few customer nodes, which is a manageable number. This process of creating a tree of dispatchers is called fanning out.

Only those nodes that can talk to the backend are called dispatchers so only the first layer/tier of the nodes are dispatchers. The nodes that can be eligible as dispatchers can be selected based on security requirements. The planner may know which nodes are dispatchers.

In an example embodiment, the fanning out may include forming a plurality of node trees for delegation of commands. The plurality of node trees may have a plurality of layers of nodes. A top layer of the plurality of layers of nodes may be capable of communicating with a controlling module (e.g., a planner of the backend). Leaves of the plurality of node trees may be configured to execute the one or more tasks.

The same command can be sent out on more than one dispatch tree. The amount of duplication can depend on the desired fault tolerance. So, if smaller fault tolerance is desired, the number of trees used for duplication may be increased. Therefore, a desired fault tolerance may be controlled by duplicating node trees of the plurality of node trees. A number of the duplicated node trees may be selected based on the desired fault tolerance.

Therefore, control agents can use one node to manage some other nodes. Therefore, a customer node can include an API. Even though software cannot be installed on this customer node, a program can be installed on another customer node that can speak with the API of the customer node and manage the customer node via another customer node. This can allow the control agents to push down the task of managing to a node which does not run one of the control agents. Therefore, an agent/plugin allowing for managing different types of devices through some other devices may be used.

Figure 4:
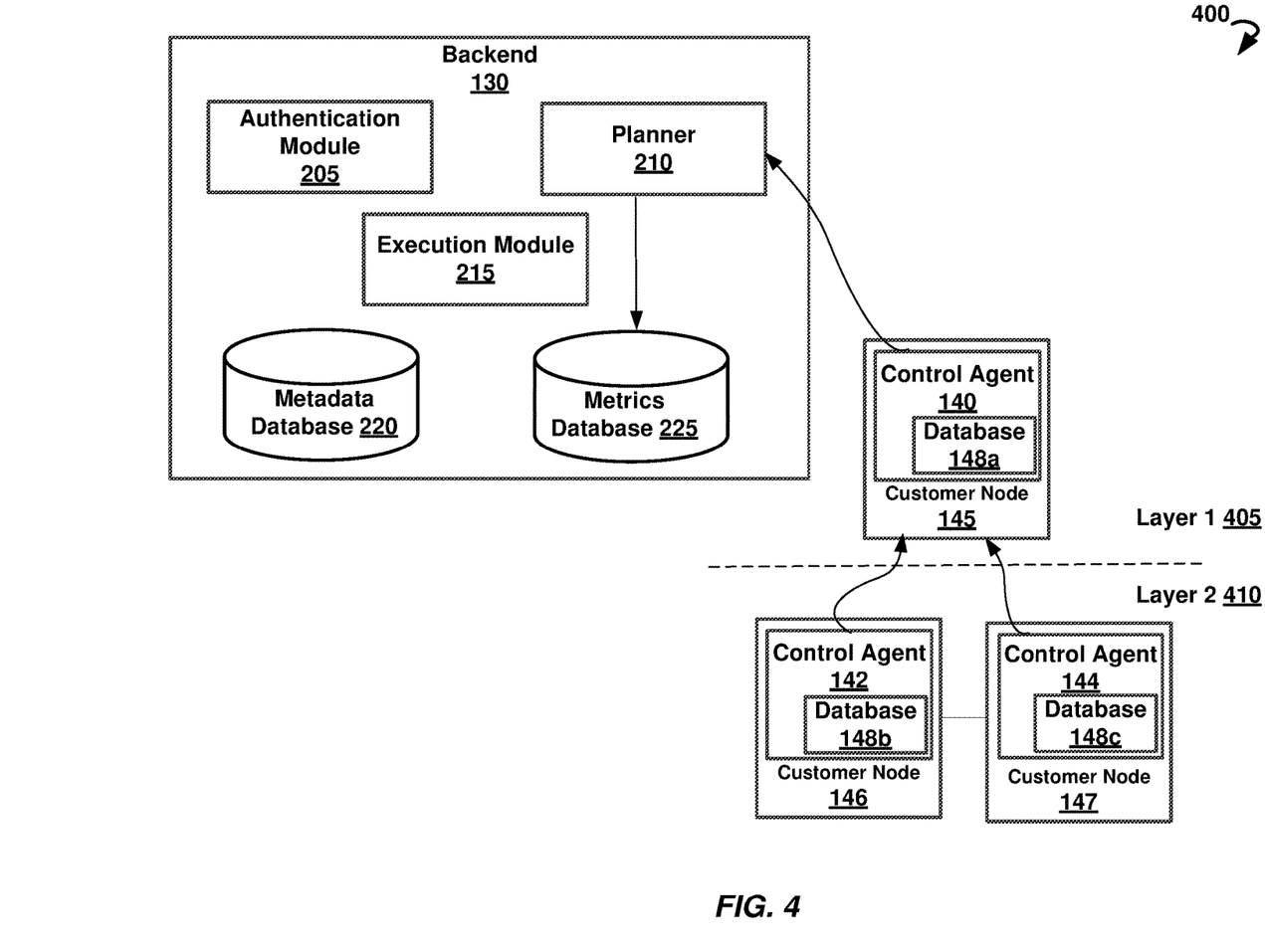
FIG. 4 is a block diagram showing pushing down a fanning out procedure to customer nodes by a backend, according to an example embodiment.

FIG. 4 is a block diagram 400 showing pushing down a fanning out procedure to customer nodes by a backend, according to an example embodiment. Control agents 140, 142, and 144 can collect various metrics of customer nodes 145, 146, and 147 on which the control agents 140, 142, and 144 are deployed, respectively. The control agents 140, 142, and 144 can be assigned to different layers. For example, the control agent 140 may belong to layer 1 405 and the control agents 142 and 144 may belong to layer 2 410. The control agents 142 and 144 of layer 2 410 may report metrics to the control agent 140 of layer 1 405, and only the control agent 140 of layer 1 405 may be allowed to report all metrics (both the metrics collected by the control agent 140 and the metrics received from the agents 142 and 144) to the planner 210 of the backend 130.

State Determination.

The problem faced by the conventional state determination systems is that from the time a threshold is exceeded and an action is taken, the state can change because of the time required for the queries to return results to the backend. Also, the planner needs to continuously run queries against all nodes, thereby creating a lot of network traffic. There may be a big of number of various thresholds and corresponding actions that can create a huge amount of traffic.

In the system of the present disclosure, instead of creating the queries on the backend, queries may be preinstalled on each customer node. Each customer node may report its state once a trigger condition is satisfied. So the planner, instead of continuously running a query against all the customer nodes and comparing results to the threshold, may send a message to some of the customer nodes (i.e., to the control agents deployed on the customer nodes) instructing the customer nodes to install a rule. For example, the rule may instruct the customer node to check the CPU utilization at a predetermined frequency, compare the value to a predetermined threshold, and send the result back only if the CPU utilization exceeds the threshold. This may result in a great scalability because the cost of comparing the CPU utilization on an individual customer node is small. Furthermore, this may result in the decrease in the number of total events generated because the determination of the state by each node eliminates the traffic from the nodes on which the CPU utilization is not exceeded. From a computational demand perspective, there may be massive lists of alarms which can be pushed down to customer nodes. This may result in large network savings by installing trigger conditions on the customer nodes and performing the reporting by the customer nodes only when there is a trigger condition. For example, whenever any one of the customer nodes exceeds 90% of CPU utilization (a triggering event), a control agent of the customer node may issue an alarm and/or create a support ticket. The control agent may have a set of queries and may check the customer node based on the queries. The backend may receive results back from the control agents, generate a list of all customer nodes that exceed 90% of CPU utilization, and take predetermined actions.

Thus, the backend may push down, to customer nodes, rules for generating events based on determination of a predetermined state. The idea of pushing down the computation of events is related to eliminating a measurement lag.

Remediation.

The remediating action can be pushed down to customer nodes. For example, a high CPU utilization may indicate that software of a Java virtual machine is poorly written and creates an infinite loop in a thread pool which consumes resources. A possible remediation is to kill the Java virtual machine and bring the Java virtual machine back up again. This remediation does not require coordination with other nodes, so this action can be pushed down to the customer nodes for being executed by control agents deployed on the customer nodes. While this approach does not eliminate the need for some central coordination or monitoring, it reduces these needs.

The backend can receive CPU usage for all customer node, compare the CPU usage to an alert threshold, count the number of customer nodes that exceeded the alert threshold, and perform remediating actions. For example, the remediating action may include scaling up or scaling down the number of active customer nodes.

When there is a large number of customer nodes, at any given time a subset of customer nodes are down or a subset of customer nodes is slow. It may take too long to wait until every customer node reports back its result, and some customer nodes may never report back. Therefore, the backend may not demand that every customer node completes the result. Instead, the actual available output of executing some step by some number of customer nodes is what is computed.

Moreover, if the backend does not receive a result or receives the result too late, the backend may create failure information. If a node higher in the tree learns that a node lower in the tree failed, subsequent nodes may know not to wait for this failed node. The information about the failed node may be passed by active node along with its results such that the subsequent node knows not to wait for results of the failed node. This is a crucial aspect for fault tolerance because failures need to be tolerated to allow scalability as in some cases results need to be computed despite the failures.

Figure 5:
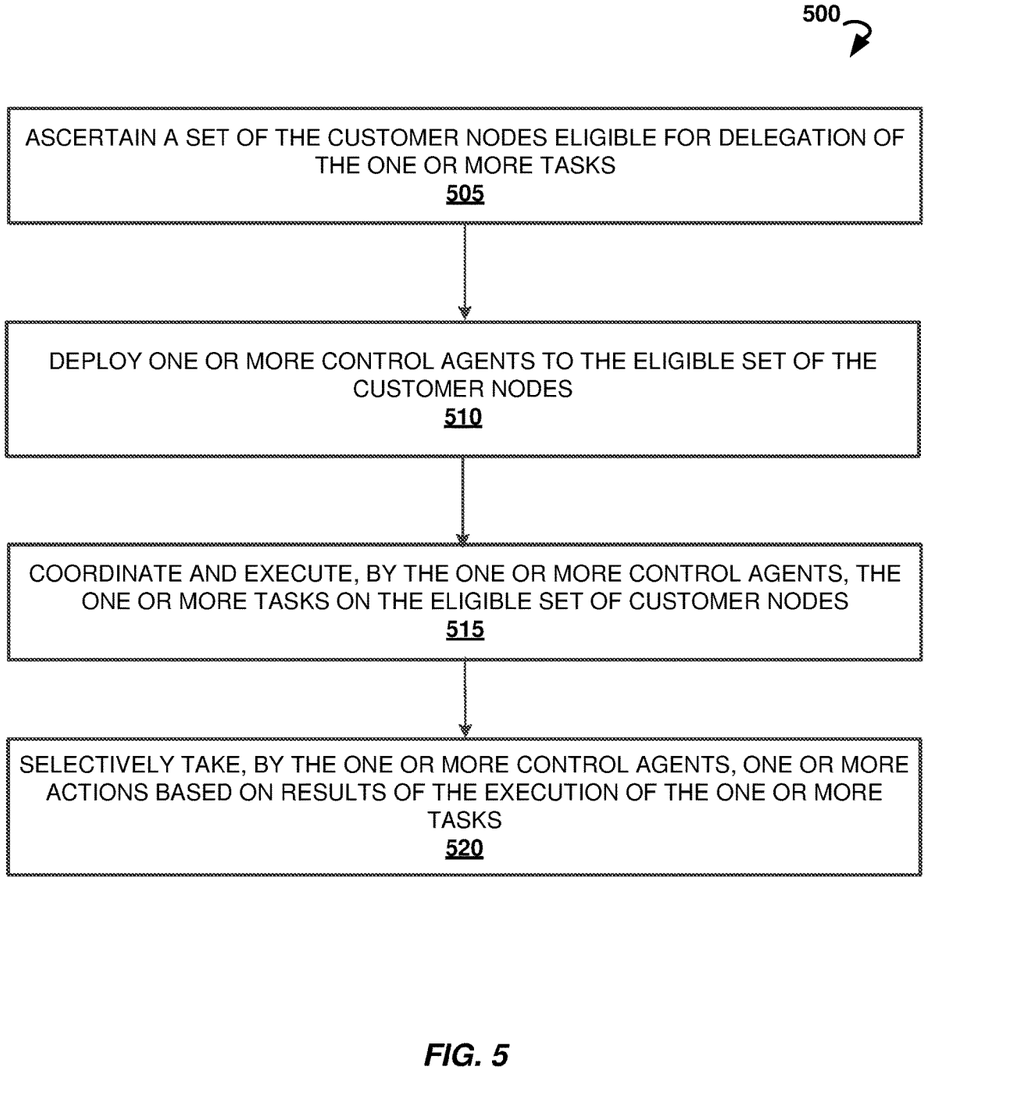
FIG. 5 is a flow chart showing a method for scaling performance across a large number of customer nodes by delegating management of execution of one or more tasks to the customer nodes, according to an example embodiment.

FIG. 5 is a flow chart showing a method 500 for scaling performance across a large number of customer nodes by delegating management of execution of one or more tasks to the customer nodes, according to an example embodiment. The method 500 may be performed by processing logic that comprises hardware (e.g., decision-making logic, dedicated logic, programmable logic, ASIC, and microcode), software (such as software run on a general-purpose computer system or a dedicated machine), or a combination of both. Below recited operations of the method 500 may be implemented in an order different than described and shown in the figure. Moreover, the method 500 may have additional operations not shown herein, but which can be evident to those skilled in the art from the present disclosure. The method 500 may also have fewer operations than outlined below and shown in FIG. 5.

The method 500 can commence with ascertaining a set of the customer nodes eligible for delegation of the one or more tasks at step 505. The method 500 may further include deploying one or more control agents to the eligible set of the customer nodes at step 510. Each of the customer nodes may be a network device and each of the one or more control agents may communicate with and leverage APIs installed on the customer nodes.

Each of the one or more control agents may be configured to perform a plurality of operations. Specifically, the one or more control agents may be configured to coordinate and execute the one or more tasks on the eligible set of customer nodes at step 515. Furthermore, the one or more control agents may be configured to selectively take one or more actions based on results of the execution of the one or more tasks at step 520. In an example embodiment, the one or more tasks may include determining CPU utilization or determining memory utilization. The one or more tasks may be executed in parallel on the eligible set of the customer nodes.

In an example embodiment, the one or more control agents may be configured to implement one or more of the following procedures: coordination, planning, state determination, fanning out, and remediation. The coordination may include nominating a subset of the customer nodes to perform various tasks. The subset of the customer nodes may be configured to aggregate results of a query, perform computations on the results of the query, and provide final results of the computations.

The fanning out may include forming a plurality of node trees for delegation of commands. The plurality of node trees may have a plurality of layers of nodes. A top layer of the plurality of layers of nodes may be capable of communicating with a controlling module (e.g., a planner of a backend). Leaves of the plurality of node trees may be configured to execute the one or more tasks. In an example embodiment, a desired fault tolerance may be controlled by duplicating node trees of the plurality of node trees. The selection of a number of the duplicated node trees may be based on the desired fault tolerance.

The state determination may include configuring the one or more control agents to collect metrics of one or more customer nodes corresponding to the one or more control agents, report the metrics, and take actions if the metrics set off triggering conditions. The actions may include one or more of the following: issuing an alarm, creating a support ticket, taking a remediation action, and so forth.

Figure 6:
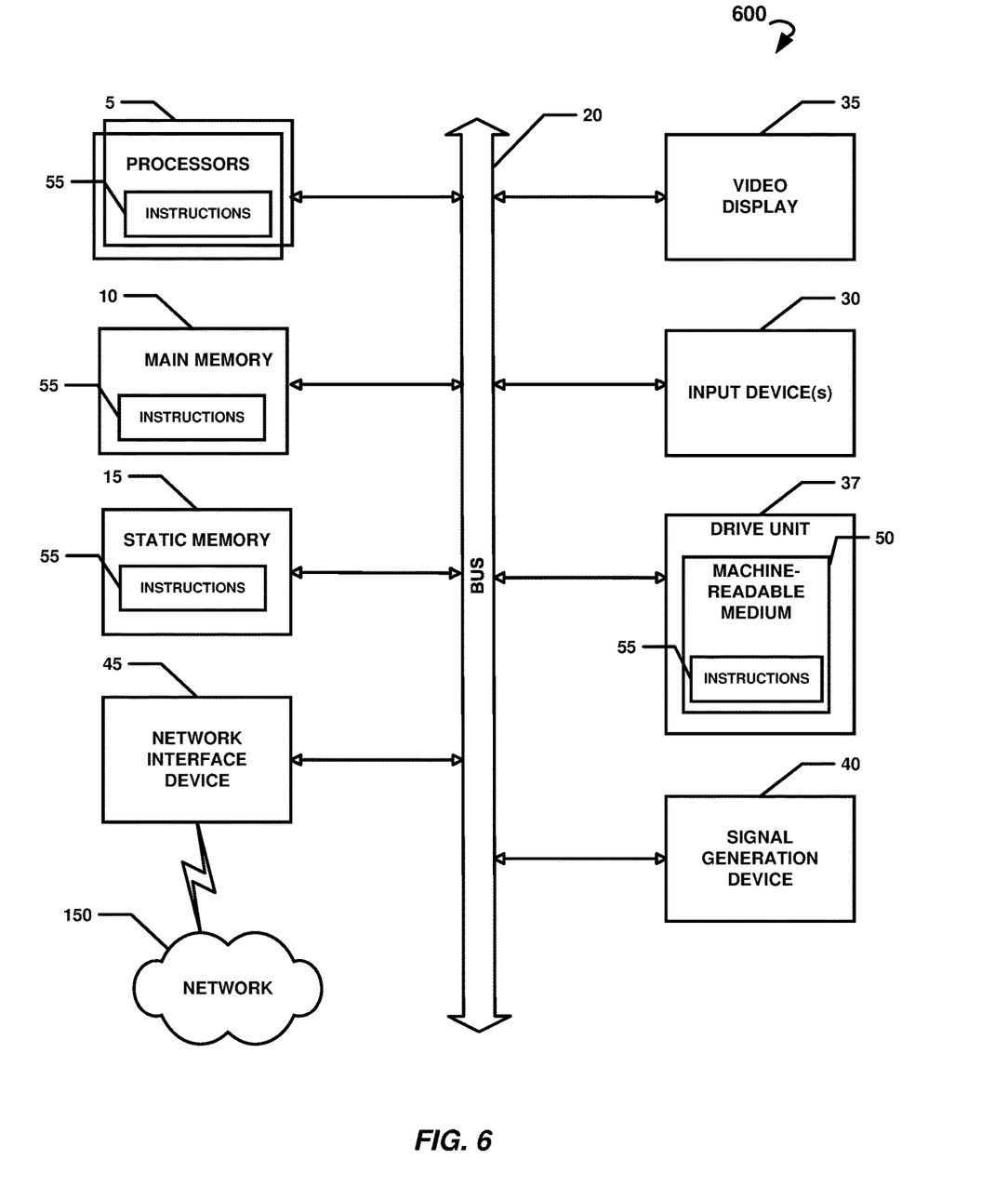
FIG. 6 is a schematic diagram of a computing system that is used to implement embodiments according to the present technology.

FIG. 6 is a diagrammatic representation of an example machine in the form of a computer system 600, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processor or multiple processor(s) 5 (e.g., a CPU, a graphics processing unit (GPU), or both), and a main memory 10 and static memory 15, which communicate with each other via a bus 20. The computer system 600 may further include a video display 35 (e.g., a liquid crystal display (LCD)). The computer system 600 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 600 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 800. The main memory 10 and the processor(s) 5 may also constitute machine-readable media.

The instructions 55 may further be transmitted or received over a network (e.g., network 150, see FIG. 1) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or steps plus functional elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems,) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, and so forth in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term may be interchangeably used with its non-italicized version. Such occasional interchangeable uses shall not be considered inconsistent with each other.

Also, some embodiments may be described in terms of a "means for" performing a task or set of tasks. It will be understood that a "means for" may be expressed herein in terms of a structure, such as a processor, a memory, an input/output (I/O) device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "electrically connected," and so forth, are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for scaling performance across a large number of customer nodes by delegating management of execution of one or more tasks to the customer nodes, the method comprising:
    ascertaining a set of the customer nodes eligible for delegation of the one or more tasks; and
    deploying one or more control agents to the eligible set of the customer nodes, wherein the one or more control agents are configured to:
        implement one or more of the following procedures: planning, coordination, state determination, fanning out, and remediation, the fanning out includes forming a plurality of node trees for delegation of commands, the plurality of node trees having a plurality of layers of nodes, a top layer of the plurality of layers of nodes being capable of communicating with a controlling module, and leaves of the plurality of node trees being configured to execute the one or more tasks;
        control a desired fault tolerance by duplicating node trees of the plurality of node trees, a number of the duplicated node trees being based on the desired fault tolerance;
        coordinate and execute the one or more tasks on the eligible set of the customer nodes; and
        selectively take one or more actions based on results of the execution of the one or more tasks.
2. The method of claim 1, wherein the one or more tasks include determining central processing unit (CPU) utilization or determining memory utilization.

3. The method of claim 1, wherein the one or more tasks are executed in parallel on the eligible set of the customer nodes.
4. The method of claim 1, wherein the coordination includes nominating a subset of the set of the customer nodes to perform various tasks of the one or more tasks, the subset of the customer nodes being configured to:
    aggregate results of a query;
    perform computations on the results of the query; and
    provide final results of the computations.
5. The method of claim 1, wherein the state determination includes configuring the one or more control agents to:
    collect metrics of one or more customer nodes corresponding to the one or more control agents;
    report the metrics; and
    take actions if the metrics set off triggering conditions.
6. The method of claim 5, wherein the actions include one or more of the following: issuing an alarm, creating a support ticket, and taking a remediation action.
7. The method of claim 1, wherein each of the customer nodes is a network device and the one or more control agents communicate with and leverage application programming interfaces (APIs) installed on the customer nodes.
8. A system for scaling performance across a large number of customer nodes by delegating management of execution of one or more tasks to the customer nodes, the system comprising:
    a backend module, the backend module including one or more processors configured to:
        ascertain a set of the customer nodes eligible for delegation of the one or more tasks; and
        deploy one or more control agents to the eligible set of the customer nodes;
    the one or more control agents, wherein the one or more control agents are configured to:
        implement one or more of the following procedures: planning, coordination, state determination, fanning out, and remediation, the fanning out includes forming a plurality of node trees for delegation of commands, the plurality of node trees having a plurality of layers of nodes, wherein a top layer of the plurality of layers of nodes is capable of communicating with a controlling module, leaves of the plurality of node trees are configured to execute the one or more tasks, a desired fault tolerance is controlled by duplicating node trees of the plurality of node trees, and a number of the duplicated node trees is based on the desired fault tolerance;
        coordinate and execute the one or more tasks on the eligible set of the customer nodes; and
        selectively take one or more actions based on results of the execution of the one or more tasks; and
    a memory communicatively coupled to the one or more processors, the memory storing instructions executable by the one or more processors.
9. The system of claim 8, wherein the one or more tasks are executed in parallel on the eligible set of the customer nodes.
10. The system of claim 8, wherein the coordination includes nominating a subset of the set of the customer nodes to perform various tasks of the one or more tasks, the subset of the customer nodes being configured to:
    aggregate results of a query;
    perform computations on the results of the query; and
    provide final results of the computations.
11. The system of claim 8, wherein the state determination includes configuring the one or more control agents to:

collect metrics of one or customer more nodes corresponding to the one or more control agents;

report the metrics; and take actions if the metrics set off triggering conditions.

12. The system of claim 11, wherein the actions include one or more of the following: issuing an alarm, creating a support ticket, and taking a remediation action.

13. The system of claim 8, wherein each of the customer nodes is a network device and the one or more control agents communicate with and leverage application programming interfaces (APIs) installed on the customer nodes.

14. A system for scaling performance across a large number of customer nodes by delegating management of execution of one or more tasks to the customer nodes, the system comprising:

a backend module, the backend module including one or more processors configured to:

ascertain a set of the customer nodes eligible for delegation of the one or more tasks; and deploy one or more control agents to the eligible set of the customer nodes; the one or more control agents, wherein the one or more control agents are configured to:

coordinate and execute the one or more tasks on the eligible set of the customer nodes;

selectively take one or more actions based on results of the execution of the one or more tasks; and implement one or more of the following procedures: planning, coordination, state determination, fanning out, and remediation;

wherein the coordination includes nominating a subset of the customer nodes to perform various tasks, the subset of the customer nodes being configured to:

aggregate results of a query;

perform computations on the results of the query; and provide final results of the computations;

wherein the fanning out includes forming a plurality of node trees for delegation of commands, the plurality of node trees having a plurality of layers of nodes, wherein a top layer of the plurality of layers of nodes is capable of communicating with a controlling module, a desired fault tolerance being controlled by duplicating node trees of the plurality of node trees, a number of the duplicated node trees being based on the desired fault tolerance; and wherein leaves of the plurality of node trees are configured to execute the one or more tasks; and a memory communicatively coupled to the one or more processors, the memory storing instructions executable by the one or more processors.

* * * * *

UNITED STATES PATENT AND TRADEMARK OFFICE
CERTIFICATE OF CORRECTION

PATENT NO. : 11,157,282 B2
APPLICATION NO. : 16/792979
DATED : October 26, 2021
INVENTOR(S) : Anurag Gupta et al.

Page 1 of 1

It is certified that error appears in the above-identified patent and that said Letters Patent is hereby corrected as shown below:

In the Claims

Column 17 Lines 21-24, Claim 14 delete:
"deploy one or more control agents to the eligible set of
 the customer nodes; the one or more control agents,
 wherein the one or more control agents are configured to:"

And insert:
 --deploy one or more control agents to the eligible set of
 the customer nodes;
the one or more control agents, wherein the one or more control agents are configured to:--

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*